(12) United States Patent
Chu et al.

(10) Patent No.: US 8,471,922 B2
(45) Date of Patent: Jun. 25, 2013

(54) IMAGE PROCESSING SYSTEM AND IMAGE PROCESSING METHOD

(75) Inventors: Li Chu, Taoyuan County (TW); Ding Li, Taipei County (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 234 days.

(21) Appl. No.: 12/756,186

(22) Filed: Apr. 8, 2010

(65) Prior Publication Data

US 2011/0037867 A1 Feb. 17, 2011

(30) Foreign Application Priority Data

Aug. 17, 2009 (TW) .............................. 98127568 A

(51) Int. Cl.
*H04N 5/228* (2006.01)

(52) U.S. Cl.
USPC ...................................... 348/222.1

(58) Field of Classification Search
None
See application file for complete search history.

(56) References Cited

U.S. PATENT DOCUMENTS

| | | | | |
|---|---|---|---|---|
| 5,517,331 | A * | 5/1996 | Murai et al. | 358/486 |
| 6,373,523 | B1 * | 4/2002 | Jang | 348/273 |
| 6,778,216 | B1 * | 8/2004 | Lin | 348/333.11 |
| 7,671,913 | B2 * | 3/2010 | Kume et al. | 348/305 |

FOREIGN PATENT DOCUMENTS

| | | |
|---|---|---|
| CN | 1604141 A | 4/2005 |
| CN | 101277436 A | 10/2008 |
| TW | 200847127 | 12/2008 |

* cited by examiner

*Primary Examiner* — Luong T Nguyen

(74) *Attorney, Agent, or Firm* — Winston Hsu; Scott Margo

(57) ABSTRACT

An image processing system includes: an image sensor for sensing a scene to generate image data, an image receiver, and an image interface coupled between the image sensor and the image receiver for receiving the image data generated by the image sensor and detecting a data format of the image data to selectively output the image data to the image receiver.

11 Claims, 4 Drawing Sheets

IMAGE PROCESSING SYSTEM AND IMAGE PROCESSING METHOD

BACKGROUND OF THE INVENTION

1. Field of the Invention

The present invention relates to an image processing system and a related method, and more particularly, to an image processing system that selectively outputs an image picture to an image receiver according to a data format of the image picture, and a method thereof.

2. Description of the Prior Art

In an image system, an image sensor is for sensing a scene in order to generate corresponding image data. The image data is then transmitted to an image processing circuit to further process the image data. More specifically, when the image processing system is in a normal operational state, the image data is transmitted between the image sensor and the image processing circuit via a specific data format (e.g., a specific image resolution). In other words, the image processing circuit can only receive and process image data of the specific data format. If the image data generated by the image sensor does not comply with the specific data format, the image processing circuit cannot process the image data, leading to situations such as system crash or efficiency degradation.

When the image system has just been activated or rebooted, the image sensor will be in an unstable state and requires some time to stabilize. When the image sensor is in this unstable state, the image data generated thereof cannot comply with the specific data format required by the image processing circuit, leading to the aforementioned issues. Therefore, how to prevent the image processing circuit from receiving image data not complying with the desired data format for enhancing the stability as well as efficiency of the image processing system has become an issue to be solved in this field.

SUMMARY OF THE INVENTION

One objective of the present invention is to provide an image processing system which selectively outputs image data to an image receiver according to a data format of an image picture, and a method thereof.

According to a first embodiment of the present invention, an image processing system is provided. The image processing system comprises an image sensor, an image receiver and an image interface. The image sensor senses a scene to generate image data. The image interface is coupled between the image sensor and the image receiver for receiving the image data generated by the image sensor and detecting a data format of the image data to selectively output the image data to the image receiver.

According to a second embodiment of the present invention, an image processing method is provided. The image processing method comprises the following steps: sensing a scene to generate image data; and receiving the image data and determining a format of the image data to selectively output the image data to an image receiver.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
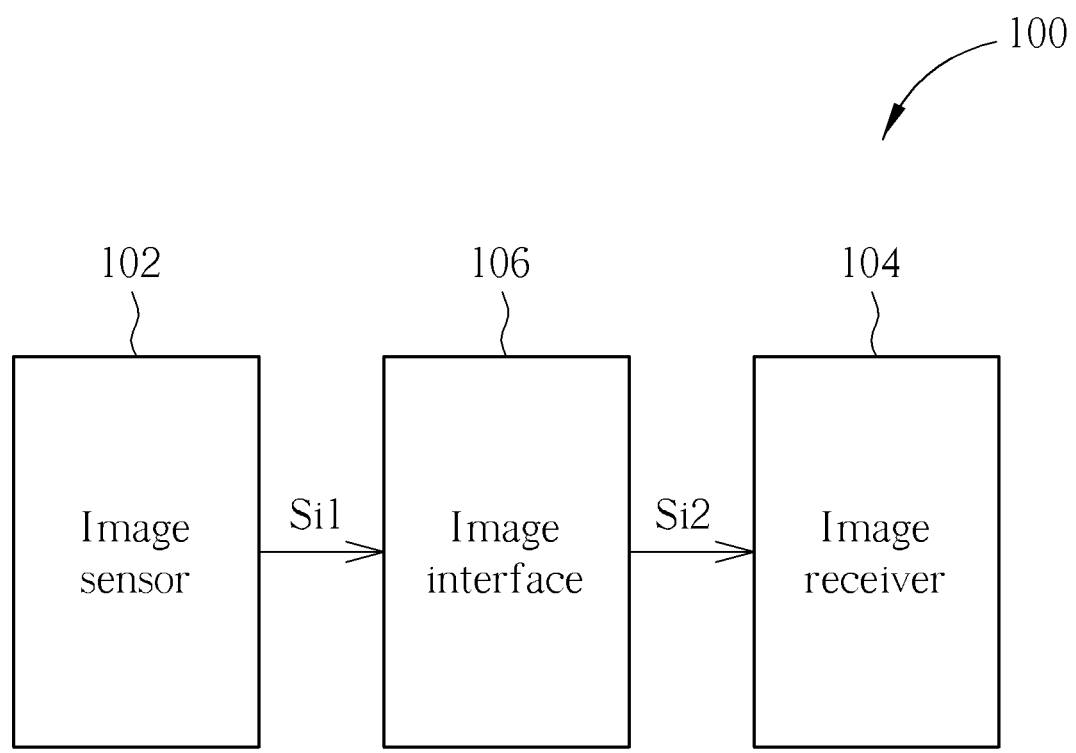
FIG. 1 is a diagram of an image processing system according to an embodiment of the present invention.

Please refer to FIG. 1. FIG. 1 is a diagram of an image processing system 100 according to an embodiment of the present invention. The image processing system 100 includes an image sensor 102, an image receiver 104 and an image interface 106. The image sensor 102 is for sensing a scene to generate image data Si1. The image interface 106 is coupled between the image sensor 102 and the image receiver 104, and is for receiving the image data Si1 generated by the image sensor 102 and detecting a data format of the image data Si1 to selectively output the image data Si1 as an image data Si2 to the image receiver 104. In this embodiment, the data format is an image resolution, but this is not meant to be a limitation to the present invention. For example, in other embodiments of the present invention, the data format can also be a white balance parameter of the image data Si1. Additionally, the image receiver 104 is for further processing received image data Si2. Please note that the present invention does not put a limit on the implementation of the image receiver 104. The image receiver 104 can be any kind of image processing circuit or simply a storage apparatus. For instance, in one embodiment, the image receiver 104 is an image compressor used to perform an image compression for the received image data Si2; in another embodiment, the image receiver 104 is an image filter used to perform a noise filtering upon the received image data Si2; and in yet another embodiment, the image receiver 104 can also be an image buffer for transmitting the received image data Si2 to a computer host or a storage apparatus.

In this embodiment, the image interface 106 determines whether the data format of the image data Si1 complies with a specific data format or not, e.g., determines whether an image resolution of the image data Si1 complies with a specific image resolution (for example, a predetermined image resolution of an image which is supposed to be received when the image receiver 104 is activated). If the data format of the image data Si1 complies with the specific data format, the image interface 106 thereby outputs the image data Si1 as the image data Si2 to the image receiver 104, and if the data format of the image data Si1 does not comply with the specific data format, the image interface 106 does not output the image data Si2 to the image receiver 104. Therefore, in another embodiment of the present invention, the image interface 106 can also be implemented by an image filter for blocking images with resolutions out of the range of the specific image resolution, thereby only allowing images with resolutions falling within the range of the specific image resolution to be outputted.

Figure 2:
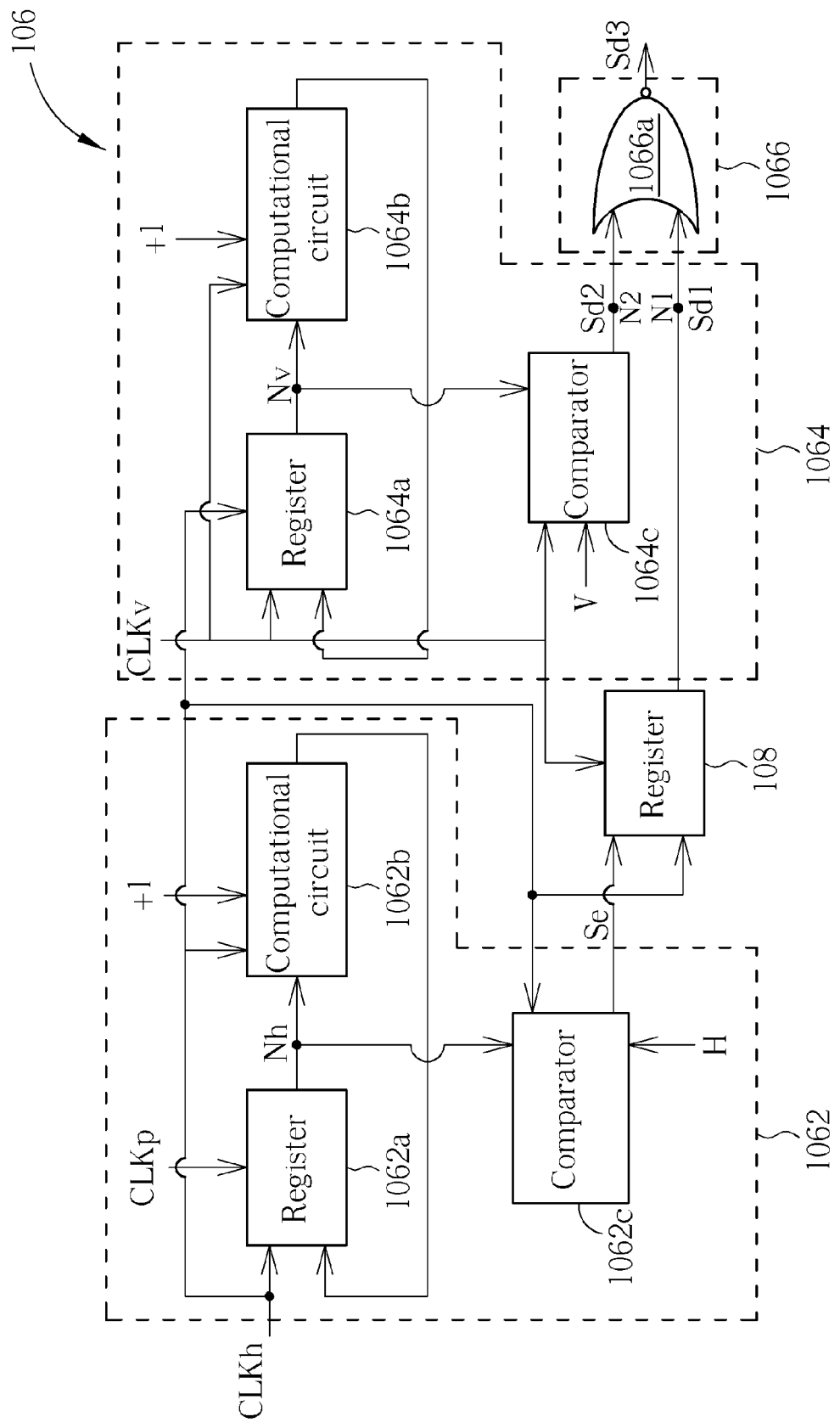
FIG. 2 is a diagram of an image interface within an image processing system according to one embodiment of the present invention.

Please refer to FIG. 2. FIG. 2 is a diagram of the image interface 106 within the image processing system 100 according to one embodiment of the present invention. The image interface 106 includes a first detector 1062, a second detector 1064 and a determining apparatus 1066. The first detector 1062 is coupled to the image sensor 102, and is for detecting whether a horizontal resolution Rh of the image data Si1 complies with a specific horizontal resolution H to generate a first detection result Sd1. The second detector 1064 is coupled to the image sensor 102, and is for detecting whether a vertical resolution Rv of the image data Si1 complies with a specific vertical resolution V to generate a second detection result Sd2. The determining apparatus 1066 is coupled to the first detector 1062 and the second detector 1064, and is for referring to the first detection result Sd1 and the second detection result Sd2 to determine whether the image resolution of the image data Si1 complies with a specific resolution R, thereby generating a third detection result Sd3, and then selectively outputting the image data Si1 as the image data Si2 to the image receiver 104 according to the third detection result Sd3. Please note that, in this embodiment, the actual contents of the image data Si1 and the image data Si2 are the same, i.e., the image interface 106 only conveys image data without altering the contents of image data. In this embodiment, when the first detection result Sd1 indicates that the horizontal resolution Rh does not comply with the specific horizontal resolution H or when the second detection result Sd2 indicates that the vertical resolution Rv does not comply with the specific vertical resolution V, the third detection result Sd3 thereby indicates that the image resolution of the image data Si1 does not comply with the specific resolution R.

The first detector 1062 includes a register 1062a, a computational circuit 1062b and a comparator 1062c. The register 1062a is coupled to the image sensor 102, and is for storing a number of vertical pixels Nh of the image data Si1, and outputting the number of vertical pixels Nh according to a pixel clock CLKp of the image data Si1. The computational circuit 1062b is coupled to the register 1062a, and is for performing a logic computation for the number of horizontal pixels Nh to update the number of horizontal pixels Nh stored in the register 1062a. The comparator 1062c is coupled to the register 1062a, and is for performing a comparison between the number of horizontal pixels Nh and the specific horizontal resolution H to generate the first detection result Sd1. The second detector 1064 includes a register 1064a, a computational circuit 1064b and a comparator 1064c. The register 1064a is coupled to the image sensor 102, and is for storing a number of vertical pixels Nv of the image data Si1, and outputting the number of vertical pixels Nv according to a horizontal synchronization clock CLKh of the image data Si1. The computational circuit 1064b is coupled to the register 1064a, and is for performing a logic computation for the number of vertical pixels Nv to update the number of vertical pixels Nv stored in the register 1064a. The comparator 1064c is coupled to the register 1064a, and is for performing a comparison between the number of vertical pixels Nv and the specific vertical resolution V to generate the second detection result Sd2. In addition, in this embodiment, the determining apparatus 1066 is implemented by a NOR gate 1066a, wherein the NOR gate 1066a has a first input terminal and a second input terminal coupled to the first detection result Sd1 and the second detection result Sd2, respectively, and the output signal of the OR gate 1066a is the third detection result Sd3.

To further illustrate the technical features of the image interface 106 in the image processing system 100 of the present invention, this embodiment takes an image resolution 640*480 as the specific image resolution R to describe the operation of the image interface 106, wherein the value 640 represents the specific horizontal resolution H and the value 480 is the specific vertical resolution V. However, those skilled in this art would readily appreciate that this is not a limitation to the present invention. Utilizing the image processing system 100 to deal with other image resolutions, e.g., 320*240, also falls within the scope of the present invention. According to the embodiment shown in FIG. 1, when the image processing system 100 has just been activated or rebooted, the image sensor 102 will start to sense the scene in order to generate the image data Si1 to the image interface 106. The image data comprises an image picture clock CLKv, the horizontal synchronization clock CLKh, the pixel clock CLKp and a pixel data Dp, wherein the image picture clock CLKv is synchronous to a scanning time of an image picture, the horizontal synchronization clock CLKh is synchronous to a horizontal pixel scanning time of the image picture, and the pixel clock CLKp is synchronous to each pixel data Dp of the image picture, as shown in FIG. 3 which is a timing diagram of the image picture clock CLKv, the horizontal synchronization clock CLKh, the pixel clock CLKp and the pixel data Dp generated by the image processing system 100 in FIG. 1.

Figure 3:
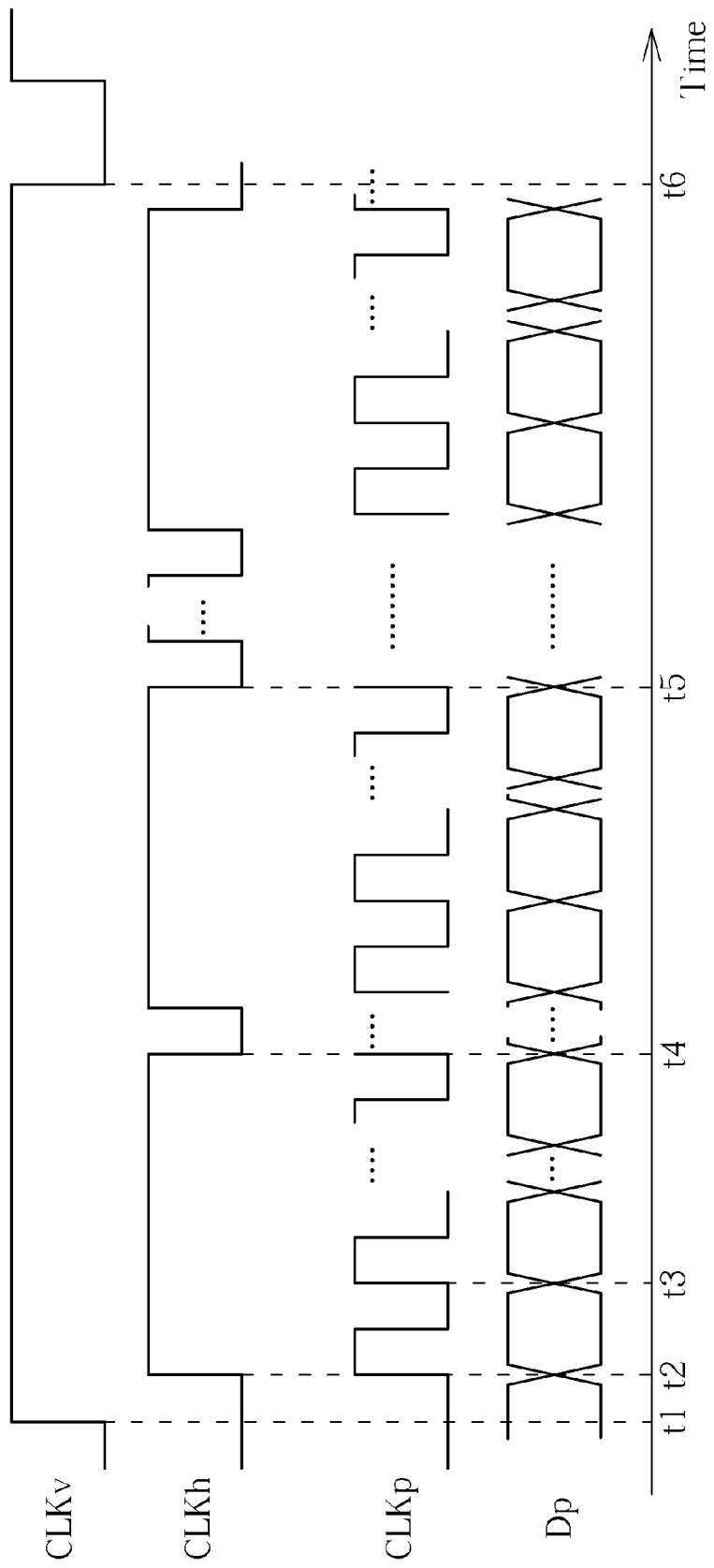
FIG. 3 is a timing diagram of an image picture clock, a horizontal synchronization clock, a pixel clock and a pixel data generated by the image processing system in FIG. 1.

Pleas refer to FIG. 2 and FIG. 3 simultaneously. The rising edge of the horizontal synchronization clock CLKh (i.e., the time when the image sensor 102 starts conveying a row of horizontal pixels, such as at a timing point t2) is for triggering the register 1062a and the computational circuit 1062b. The pixel clock CLKp is for controlling the register 1062a to read and output the number of horizontal pixels Nh. The falling edge of the horizontal synchronization clock CLKh (i.e., the time when the image sensor 102 finishes conveying the row of horizontal pixels, such as at a timing point t4) is for triggering the comparator 1062c. The rising edge of the image picture clock CLKv (i.e., the time when the image sensor 102 starts conveying an image picture, such as at a timing point t1) is for triggering the register 1064a and computational circuit 1064b. The horizontal synchronization clock CLKh is for controlling the register 1064a to read and output the number of vertical pixels Nv. The falling edge of the image picture clock CLKv (i.e., the time when the image sensor 102 finishes conveying an image picture, such as at a timing point t6) is for triggering the comparator 1064c.

Please note that, in this embodiment, the image interface 106 further has a register 108 for storing an output signal Se of the comparator 1062c. When the comparator 1062c determines that the number of horizontal pixels Nh does not equal the specific horizontal resolution H at any timing point of falling edges of the horizontal synchronization clock CLKh, the comparator 1062c asserts the output signal Se (for example, logic "1") to the register 108. Otherwise, when the comparator 1062c determines that the number of horizontal pixels Nh equals the specific horizontal resolution H, the comparator 1062c does not assert the output signal Se (for example, logic "0"). Next, at a falling edge of the image picture clock CLKv, the register 108 outputs the first detection result Sd1 to the determining apparatus 1066 according to its stored contents. When the falling edge of the image picture clock CLKv occurs, the comparator 1064c also compares the number of vertical pixels Nv and the specific vertical resolution V to generate the second detection result Sd2.

According to the embodiment of the present invention, during the scanning time interval (i.e., from the timing point t1 to the timing point t6) of the image picture, when the condition that the number of horizontal pixels Nh does not equal the specific horizontal resolution H occurs once or multiple times, the first detection result Sd1 will be a high-voltage signal; when the condition that the number of vertical pixels Nv does not equal the specific vertical resolution V occurs once or multiple times, the second detection result Sd2 will be a high-voltage signal. Therefore, when the scanning time interval of an image picture is over, if the third detection result Sd3 is a low-voltage signal, it indicates that the resolution of the image picture does not comply with the specific resolution R. If the third detection result Sd3 is a high-voltage signal, it indicates that the resolution of the image picture complies with the specific resolution R. Those skilled in this art will readily appreciate that the aforementioned method of determining an image resolution of the image picture is only one embodiment of the present invention, and is not supposed to be a limitation of implementing the present invention.

To be more specific, when the image sensor 102 generates the image data Si1 to the image interface 106 at timing point t1, the rising edge of the image picture clock CLKv will trigger the register 1064a and the computational circuit 1064b, and the rising edge of the horizontal synchronization clock CLKh will trigger the register 1062a and the computational circuit 1062b. In this embodiment, the default number stored in the register 1062a is 0, and the computational circuit 1062b performs a plus one computation (i.e., +1) for the number of horizontal pixels Nh and outputs the updated number of horizontal pixels Nh. During each period of the pixel clock CLKp, the first-half period is for controlling the register 1062a to read the number of horizontal pixels Nh generated by the computational circuit 1062b, and the second-half period is for controlling the register 1062a to output the number of horizontal pixels Nh stored within. Likewise, the default number stored in the register 1064a is 0, and the computational circuit 1064b performs a plus one computation (i.e., +1) for the number of vertical pixels Nv and outputs the updated number of vertical pixels Nv. During each period of the horizontal synchronization clock CLKh, the first-half period is for controlling the register 1064a to read the number of vertical pixels Nv generated by the computational circuit 1064b, and the second-half period is for controlling the register 1064a to output the number of vertical pixels Nv stored within.

In this way, after the rising edge of the horizontal synchronization clock CLKh triggers the register 1062a and the computational circuit 1062b, the first detector 1062 will accumulate each period of the pixel clock CLKp to generate the number of horizontal pixels Nh, and utilize the comparator 1062c to compare the number of horizontal pixels Nh and the specific horizontal resolution H at the time when the falling edge of the horizontal synchronization clock CLKh occurs (i.e., when a horizontal scanning time interval of the image picture is over). In this embodiment, the specific horizontal resolution H is set as 640. When the number of horizontal pixels Nh is not 640, the comparator 1062c thereby generates the output signal Se to the register 108. From the timing point t1 to the timing point t6 (i.e. within the time of conveying an image picture), the first detector 1062 compares the specific horizontal resolution H and the number of horizontal pixels Nh generated at each horizontal scanning time interval of the image picture. In other words, as long as the condition that the number of horizontal pixels Nh does not equal the specific horizontal resolution H occurs once during the time period from the timing point t1 to the timing point t6, the register 108 will store the output signal Se. Next, when the falling edge of the image picture clock CLKv occurs, the register 108 will generate the first detection result Sd1 to the determining apparatus 1066 according to the output signal Se stored therein.

While the comparator 1062c compares the number of horizontal pixels Nh and the specific horizontal resolution H, the second detector 1064 keeps accumulating each period of the horizontal synchronization clock CLKh to generate the number of vertical pixels Nv and utilizes the comparator 1064c to compare the number of vertical pixels Nv and the specific vertical resolution V when the falling edge of the image picture clock CLKv occurs (i.e., when a vertical scanning time interval of the image picture is over). In this embodiment, the specific vertical resolution is set as 480. When the number of vertical pixels is not 480, the comparator 1064c thereby generates the second detection result Sd2 to the determining apparatus 1066. Therefore, the second detector will compare the specific vertical resolution V and the number of vertical pixels Nv generated during each vertical scanning time interval.

In this way, when a falling edge of the image picture clock CLKv occurs, the input terminals N1 and N2 of the NOR gate 1066a will receive the first detection result Sd1 and the second detection result Sd2, respectively. In this embodiment, when the first detection result sd1 is a high-voltage signal, it indicates that at least one row of the number of horizontal pixels Nh of the image picture does not comply with the specific horizontal resolution H (i.e., the horizontal resolution Rh does not comply with the specific horizontal resolution H); similarly, when the second detection result Sd2 is a high-voltage signal, it indicates that at least one row of the number of vertical pixels Nv of the image picture does not comply with the specific vertical resolution V (i.e., the vertical resolution Rv does not comply with the specific vertical resolution V). Therefore, when the third detection result Sd3 outputted by the NOR gate 1066a is a low-voltage signal, it indicates that the image resolution of the image picture does not comply with the image resolution R, i.e., 640*480. In other words, when the third detection result Sd3 is a low-voltage signal, the image interface 106 will not output the image picture to the image receiver 104. The image interface 106 keeps receiving the next image picture generated by the image sensor 102 to detect whether its image resolution complies with the specific resolution R, and outputs an image picture to the image receiver 104 until the image resolution of the image picture complies with the image resolution R.

In view of the above, the disclosed method ensures that the image resolution of the image picture received by the image receiver 104 complies with the specification, and that none of the issues associated with the conventional technique (a system crash or an efficiency degradation when the image receiver 104 receives image pictures not complying with the specification) will occur. Please note that the application of the present invention is not limited to the time when the image processing system 100 is activated or rebooted. That is, utilizing the image interface 106 to detect the image pictures generated by the image sensor 102 while the image processing system 100 is operating also falls within the scope of the present invention. Additionally, through proper modifications, those skilled in this field can realize that the modified system is also able to detect an image resolution and a white balance parameter of the image picture generated by the image sensor 102 to determine whether the image picture complies with a predetermined data format. This feature is also within the scope of the present invention.

Figure 4:
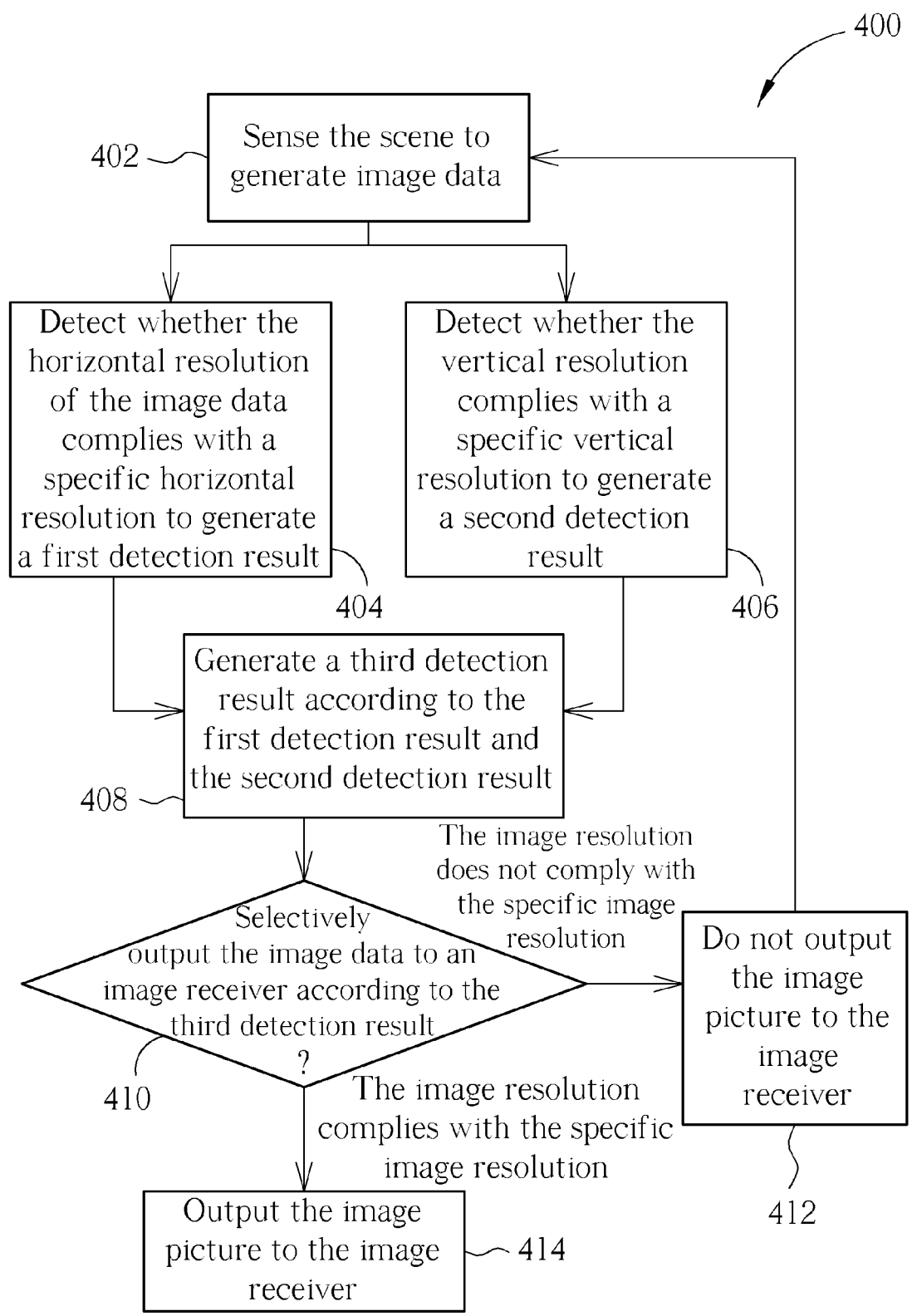
FIG. 4 is a flowchart of an image processing method according to an embodiment of the present invention.

Please refer to FIG. 4. FIG. 4 is a flowchart of an image processing method according to an embodiment of the present invention. The image processing method 400 is applied to an image processing system. For simplicity, the image processing method 400 is implemented via the image processing system 100 shown in FIG. 1, and the following description directed to the image processing method 400 is illustrated in view of the image processing system 100. Please note that utilizing the image processing system 100 to implement the image processing method 400 is only an example; actually, the image processing method 400 of the present invention is not limited to the image processing system 100. Furthermore, if the result is substantially the same, the steps are not required to be executed in the exact order shown in FIG. 4. In addition, the steps in FIG. 4 are not required to be executed sequentially, i.e., other steps can be inserted in between. The steps of the image processing method 400 are detailed as follows:

Step 402: Sense the scene to generate the image data Si1.

Step 404: Detect whether the horizontal resolution Rh of the image data complies with the specific horizontal resolution H to generate the first detection result Sd1.

Step 406: Detect whether the vertical resolution Rv complies with the specific vertical resolution V to generate the second detection result Sd2.

Step 408: Generate the third detection result Sd3 according to the first detection result Sd1 and the second detection result Sd2.

Step 410: Selectively output the image data to the image receiver 104 according to the third detection result Sd3. If the third detection result Sd3 indicates that the image resolution of the image picture does not comply with the specific resolution R, go to step 412. If the third detection result Sd3 indicates that the image resolution of the image picture complies with the specific resolution R, go to step 414.

Step 412: Do not output the image picture to the image receiver 104, and then go to step 402.

Step 414: Output the image picture to the image receiver 104.

In step 402, the image data Si1 is generated, which contains the image picture clock CLKv, the horizontal synchronization clock CLKh, the pixel clock CLKp and the pixel data Dp, as shown in FIG. 3. In step 404, the first detector 1062 detects whether the horizontal resolution Rh of each row of the image picture complies with the specific horizontal resolution H. If the horizontal resolution Rh of at least one row of the image picture does not comply with the specific horizontal resolution H, the first detection result Sd1 indicates that the horizontal resolution Rh of the image picture does not comply with the specific horizontal resolution H. Additionally, in step 406, the second detector 1064 detects whether the vertical resolution Rv of each row of the image picture complies with the specific vertical resolution V. If the vertical resolution Rv of at least one row of the image picture does not comply with the specific vertical resolution V, the second detection result Sd2 indicates that the vertical resolution Rv of the image picture does not comply with the specific vertical resolution V. Next, in step 408, if one of the first detection result Sd1 and the second detection result Sd2 indicates that the horizontal/vertical resolution does not comply with the corresponding resolution, the third detection result Sd3 indicates that the image resolution of the image picture does not comply with the specific image resolution R. Therefore, in step 412, since the image resolution of the image picture does not comply with the specific image resolution R, the image interface 106 does not output the image picture to the image receiver 104 to avoid system crash or efficiency degradation. Next, the image interface 106 keeps receiving the next image picture generated by the image sensor 102 to detect whether its image resolution complies with the specific resolution R, and does not output an image picture to the image receiver 104 until the image resolution of the image picture complies with the image resolution R (step 414). When the image interface 106 detects that an image picture complies with the specific resolution R, the image sensor 102 can be viewed as being in a stable state, and the image interface 106 thereby shuts down the function of detecting whether the image resolution of an image picture complies with the image resolution R. This is not a limitation of the present invention, however; the image interface 106 can still keep performing the function of detecting whether the image resolution of an image picture complies with the image resolution R even after detecting an image picture complying with the specific resolution R.

To summarize, the apparatus and method disclosed above ensure that the image resolution of the image picture received by the image receiver 104 complies with the required specification, and the issues encountered in the conventional art, such as a system crash or an efficiency degradation of the image receiver 104 due to receiving image pictures which do not comply with the required specification, will not occur.

Those skilled in the art will readily observe that numerous modifications and alterations of the device and method may be made while retaining the teachings of the invention.

What is claimed is:

1. An image processing system, comprising:
an image sensor, for sensing a scene to generate image data;
an image receiver; and
an image interface, coupled between the image sensor and the image receiver, for receiving the image data generated by the image sensor and detecting a data format of the image data to selectively output the image data to the image receiver;
wherein the data format is an image resolution, and the image interface comprises:
a first detector, coupled to the image sensor, for detecting whether a horizontal resolution of the image data complies with a specific horizontal resolution to generate a first detection result;
a second detector, coupled to the image sensor, for detecting whether a vertical resolution of the image data complies with a specific vertical resolution to generate a second detection result; and
a determining apparatus, coupled to the first detector and the second detector, for determining whether the image resolution of the image data complies with a specific resolution according to the first detection result and the second detection result, thereby generating a third detection result, and for selectively outputting the image data to the image receiver according to the third detection result.

2. The image processing system in claim 1, wherein the image interface determines whether the data format of the image data complies with a specific data format; when the data format of the image data complies with the specific data format, the image interface outputs the image data to the image receiver; and when the data format of the image data does not comply with the specific data format, the image interface does not output the image data to the image receiver.

3. The image processing system in claim 1, wherein when the first detection result indicates that the horizontal resolution does not comply with the specific horizontal resolution or when the second detection result indicates that the vertical resolution does not comply with the specific vertical resolution, the third detection result indicates that the image resolution of the image data does not comply with the specific resolution.

4. The image processing system in claim 1, wherein the first detector comprises:
   a register, coupled to the image sensor, for storing a number of horizontal pixels of the image data, and outputting the number of horizontal pixels according to a pixel clock of the image data;
   a computational circuit, coupled to the register, for performing a logic computation upon the number of horizontal pixels to update the number of horizontal pixels stored in the register; and
   a comparator, coupled to the register, for performing a comparison between the number of horizontal pixels and the specific horizontal resolution to generate the first detection result.

5. The image processing system in claim 1, wherein the second detector comprises:
   a register, coupled to the image sensor, for storing a number of vertical pixels of the image data, and outputting the number of vertical pixels according to a horizontal synchronization clock of the image data;
   a computational circuit, coupled to the register, for performing a logic computation upon the number of vertical pixels to update the number of vertical pixels stored in the register; and
   a comparator, coupled to the register, for performing a comparison between the number of vertical pixels and the specific vertical resolution to generate the second detection result.

6. The image processing system in claim 1, wherein the determining apparatus comprises:
   an OR gate, comprising a first input terminal and a second input terminal coupled to the first detection result and the second detection result, respectively, wherein the determining apparatus determines the third detection result according to an output of the OR gate.

7. An image processing method, comprising:
   sensing a scene to generate an image data; and
   receiving the image data and determining a data format of the image data to selectively output the image data to an image receiver;
   wherein the data format is an image resolution, and the step of selectively outputting the image data to the image receiver comprises:
   detecting whether a horizontal resolution of the image data complies with a specific horizontal resolution to generate a first detection result;
   detecting whether a vertical resolution of the image data complies with a specific vertical resolution to generate a second detection result;
   determining whether the image resolution of the image data complies with a specific resolution according to the first detection result and the second detection result, thereby generating a third detection result; and
   selectively outputting the image data to the image receiver according to the third detection result.

8. The image processing method of claim 7, wherein the step of selectively outputting the image data to the image receiver comprises:
   determining whether the format of the image data complies with a specific data format;
   when the data format of the image data complies with the specific data format, outputting the image data to the image receiver; and
   when the data format of the image data does not comply with the specific data format, not outputting the image data to the image receiver.

9. The image processing method of claim 7, wherein when the first detection result indicates that the horizontal resolution does not comply with the specific horizontal resolution or when the second detection result indicates that the vertical resolution does not comply with the specific vertical resolution, the third detection result indicates that the image resolution of the image data does not comply with the specific resolution.

10. The image processing method of claim 7, wherein the step of detecting the horizontal resolution of the image data comprises:
    storing a number of horizontal pixels of the image data in a register, and outputting the number of horizontal pixels according to a pixel clock of the image data;
    performing a logic computation upon the number of horizontal pixels to update the number of horizontal pixels stored in the register; and
    performing a comparison between the number of horizontal pixels and the specific horizontal resolution to generate the first detection result.

11. The image processing method of claim 7, wherein the step of detecting the vertical resolution of the image data comprises:
    storing a number of vertical pixels of the image data in a register, and outputting the number of vertical pixels according to a horizontal synchronization clock of the image data;
    performing a logic computation upon the number of vertical pixels to update the number of vertical pixels stored in the register; and
    performing a comparison between the number of vertical pixels and the specific vertical resolution to generate the second detection result.

* * * * *